United States Patent [19]

Danescu

[11] 4,143,984
[45] Mar. 13, 1979

[54] CONNECTOR FOR C-PROFILE BARS

[76] Inventor: Septimius Danescu, in Webgasse 43/6, A-1060, Wien VI, Austria

[21] Appl. No.: 868,296

[22] Filed: Jan. 10, 1978

[30] Foreign Application Priority Data

Jan. 14, 1977 [AT] Austria .................................. 209/77

[51] Int. Cl.² ............................................. F16D 39/00
[52] U.S. Cl. .................................... 403/194; 403/255; 403/348; 151/41.71
[58] Field of Search ............... 403/194, 199, 348, 195, 403/349, 283, 282, 279, 201, 255; 151/41.71, 41.76; 5/302; 85/1 H; 24/221 K, 221 A, 221 R

[56] References Cited

U.S. PATENT DOCUMENTS

| 2,715 | 7/1842 | Fowler | 5/302 |
| 189,258 | 4/1877 | Pope | 24/221 R |
| 240,833 | 5/1881 | Martin et al. | 403/348 X |
| 1,733,650 | 10/1929 | Cummings | 24/221 K |
| 3,589,525 | 6/1971 | Allen | 403/348 X |
| 3,826,207 | 7/1974 | Sutherlan | 108/108 |
| 3,908,330 | 9/1975 | Frach et al. | 403/348 X |

FOREIGN PATENT DOCUMENTS 1410993 10/1975 United Kingdom ..................... 403/348

Primary Examiner—Andrew V. Kundrat
Attorney, Agent, or Firm—Karl F. Ross

[57] ABSTRACT

A connector designed to couple a C-profile bar of synthetic resin or the like with another structural member comprises a shank terminating in a hammerhead which fits sideways into the slot formed by the C-flanges and is then rotated through 90° within the channel of the profile. A point carried on a transverse surface of the hammerhead, remote from the shaft, digs into the channel bottom upon such rotation as a pair of ramp faces on an opposite base surface coact with the C-flanges to cam the hammerhead more deeply into the channel whereby the connector is secured against longitudinal shifting in the profile.

9 Claims, 5 Drawing Figures

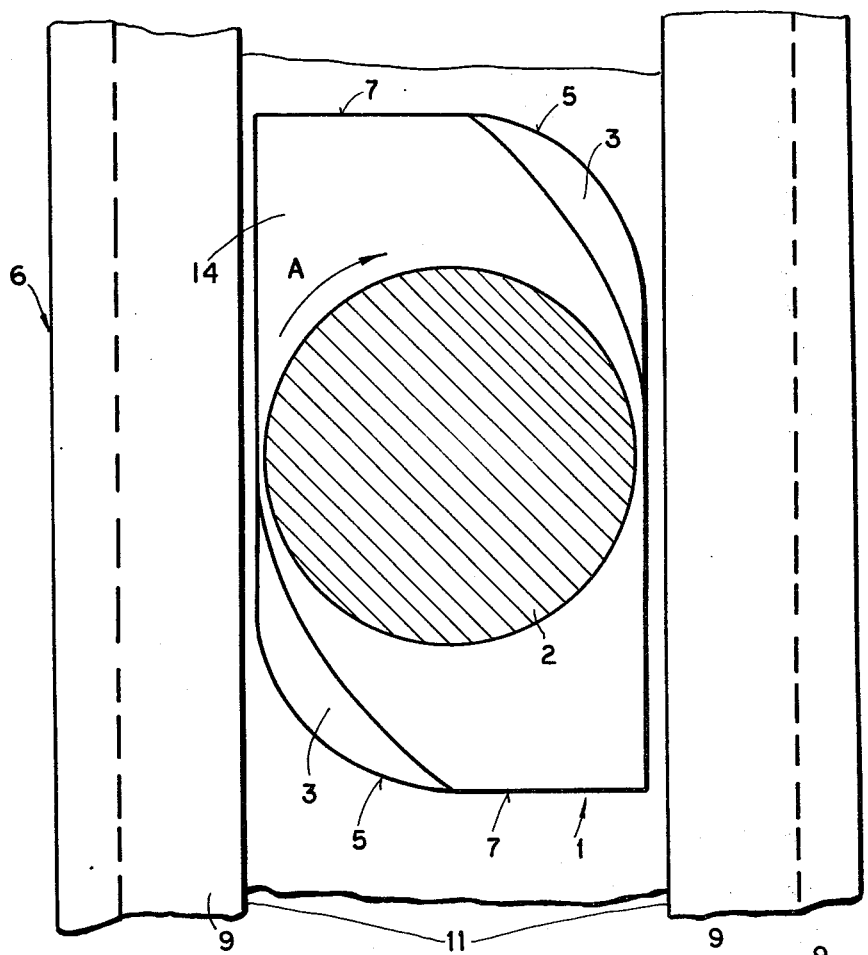
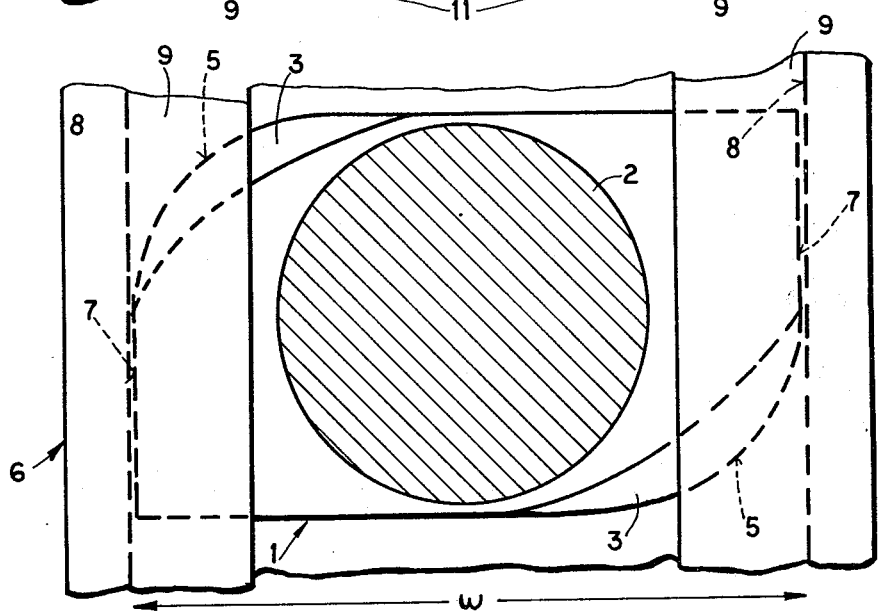

CONNECTOR FOR C-PROFILE BARS

FIELD OF THE INVENTION

My present invention relates to a connector for C-profile bars having an elongate channel which is accessible through a narrower slot flanked by the flanges of the C-profile.

BACKGROUND OF THE INVENTION

A convenient way of coupling such bars to other structural members involves the use of hammerhead-type connectors which are insertable through the slot into the channel and, upon rotation through 90°, are positively held against removal without further rotation. Not so positively determined, however, is the location of the connector along the bar since the hammerhead in its working position can freely slide in the channel unless firmly clamped in place. Thus, in cases where a longitudinal shifting of the connector is to be avoided, it has heretofore been necessary to provide supplemental fastening means for immobilizing the connector in a selected position.

OBJECT OF THE INVENTION

The object of my present invention, therefore, is to provide means in such a connector for locking same against shifting along the channel upon the emplacement thereof in the C-profile bar, without the need for any supplemental fastener.

SUMMARY OF THE INVENTION

I realize this object, pursuant to my present invention, by providing the hammerhead on a transverse surface thereof, remote from the shank on which it is carried, with a locating projection adapted to dig into the material of the C-profile bar to which it is to be secured, that projection becoming firmly lodged in the channel bottom once the hammerhead has been rotated from its insertion position into its working position.

To facilitate the penetration of the groove bottom by the locating projection, I prefer to provide the base of the hammerhead — opposite the transverse surface bearing that projection — with ramp faces shaped to coact with the C-flanges for forcing the projection into the channel bottom upon 90° rotation of the hammerhead from its insertion position. Without such ramp faces it would be necessary to drive the projection into the bar, e.g. by hammer blows, in the insertion position or (especially if the bar consists of metal or other hard material) to provide the channel bottom with a bore accommodating the projection. In any event, the distance of the tip of the projection from the base should exceed the channel depth so as to let the base come to rest on the C-flanges in the working position.

BRIEF DESCRIPTION OF THE DRAWING

The above and other features of the invention will now be described in detail with reference to the accompanying drawing in which:

FIG. 3 is a cross-sectional view taken on the line III—III of FIG. 1 but showing the connector in its insertion position;

FIG. 4 is a view similar to FIG. 3 but showing the connector in the working position of FIG. 1.

SPECIFIC DESCRIPTION

Figure 1:
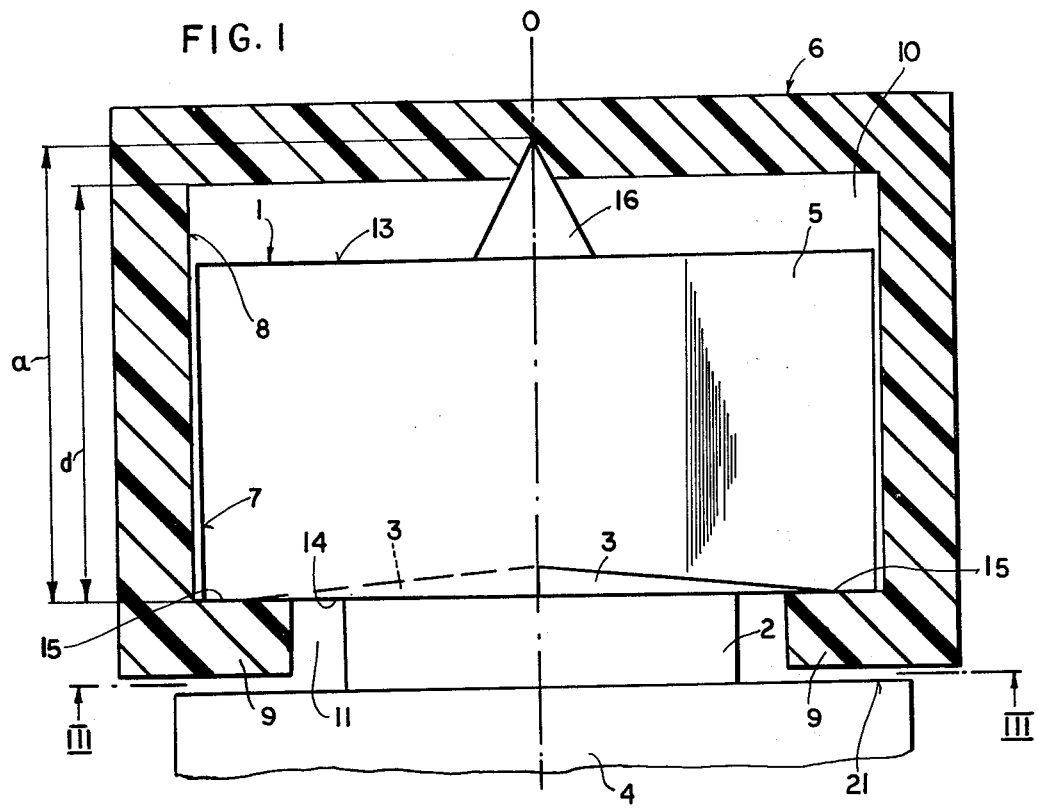
FIG. 1 is a top view of the operative portion, i.e. the hammerhead and adjoining parts, of a connector according to my invention engaging in a channel of a C-profile bar.
Figure 2:
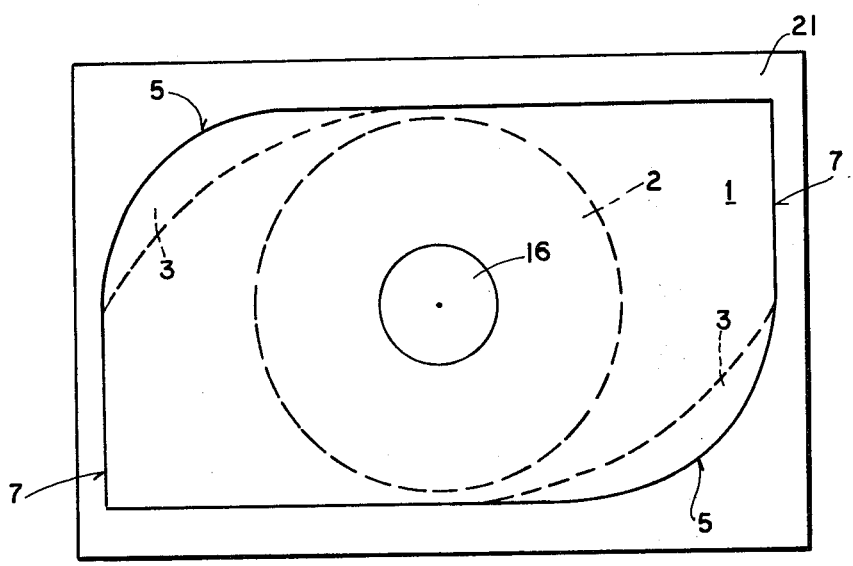
FIG. 2 is an end view of the connector shown in FIG. 1.

In the drawing I have shown a C-profile bar 6 as well as a structural member 12 (FIG. 5) to be coupled to each other by a connector embodying my invention. Bar 6 may be the termination of a convoluted strip forming part of an anchor or a centerpost for an upright partition with one or more panels, member 12 being representative of such a panel; an assembly of this character has been disclosed and claimed in my copending application Ser. No. 708,694 filed July 26 1976, now U.S. Pat. No. 4,070,808.

The connector shown in the drawing comprises a hammerhead 1 carried on a shaft 4 of rectangular cross-section. Shaft 4 is connected via a reduced cylindrical neck 2 with the base 14 of head 1, that base being separated by a narrow gap from a transverse shoulder 21 lying at the junction of neck 2 with the shaft. Base 14, whose generally rectangular outline seen in FIGS. 3 and 4 is similar to but slightly smaller than the cross-section of shaft 4, has a pair of diagonally opposite rounded corners formed by the edges of quarter-cylindrical cheeks 5 whose radius of curvature equals half the width of the rectangle. These curved edges are the outer boundaries of a pair of beveled lands 3 forming ramp faces designed to coact with flanges 9 of bar 6 upon a 90° rotation of head 1 and shaft 4 from an insertion position (FIG. 3) into a working position (FIG. 4). Such rotation in the clockwise sense, as indicated by an arrow A in FIG. 3, is facilitated by the rounding of cheeks 5 while the straight halves 7 of the minor hammerhead faces prevent any further rotation beyond the position of FIG. 4 in which these faces lie close to the lateral boundaries 8 of a longitudinal channel 10 formed by the bar 6. The opposite transverse surface 13 of head 1 carries a conical projection 16 with a tip lying on the axis O of shaft 4, this tip biting into the bottom of channel 10 opposite an entrance slot 11 defined by flanges 9. From FIGS. 3 and 4 it will be apparent that the width of head 1 is just slightly less than that of slot 11 whereas its length, greatly exceeding the slot width, is almost equal to the width w of channel 10.

As indicated in FIG. 1, the distance a from the vertex of projection 16 to the base 14 of head 1 exceeds the depth d of channel 10 so that this vertex is forcibly maintained in a notch of the channel bottom as the base comes to rest on inner surfaces 15 of flanges 9. That notch is formed automatically by the axial camming force exerted upon head 1 and projection 16 by the interaction of ramp faces 3 and flange surfaces 15 upon rotation of the head from the insertion position of FIG. 3 to the working position of FIG. 4. As indicated in the drawing, bar 6 and member 12 are both made of resinous material; at least bar 6 can be produced by extrusion.

Figure 5:
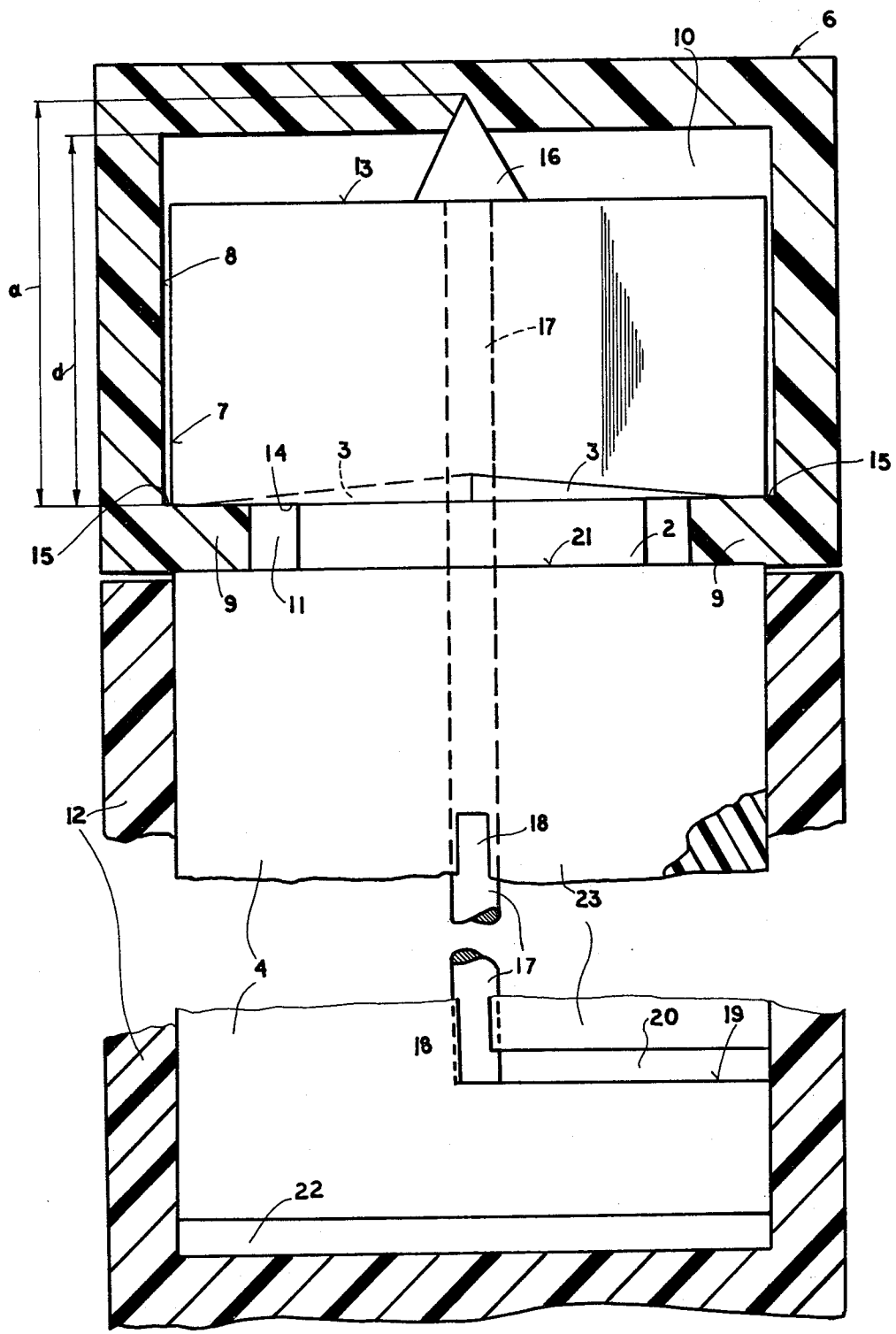
FIG. 5 is a view generally similar to FIG. 1 but showing a slightly modified connector together with a structural member to be coupled to the C-profile bar.

In FIG. 1 the thickness of flanges 9 is shown to be slightly less than the spacing of shoulder 21 from base 14. As illustrated in FIG. 5, however, that thickness may be increased so that the flanges 9 are firmly gripped between head 1 and shaft 4 in the working position.

Projection 16, which must be of a material harder than that of bar 6 and is preferably metallic, need not be conically shaped but could have a variety of other configurations, e.g. frustopyramidal or part-spherical with a pointed or ball-shaped tip at its center.

If the connector 1, 2, 4 is not metallic but is also made of plastic material, as particularly indicated for shaft 4 in FIG. 5, the projection 16 is preferably integral with a metal stem 17 axially inserted into the shaft 4. As further shown in FIG. 5, this resinous shaft may be provided with a generally elbow-shaped incision having an axial branch 18 and a transverse branch 20 partly separating a portion 23 of the shaft from the main body thereof; stem 17 is seen resting with its inserted end on the boundary 19 of branch 20 remote from head 1. If the stem 17 is introduced into an axial bore of shaft 4 narrowing in the direction away from head 1, the insertion of the stem tends to spread the partly detached portion 23 and the remainder of the shaft body in a transverse direction so as firmly to wedge the shaft in a bore 22 of member 12 in which it is received.

Bar 6 may be one of four identical profiles integral with as many interconvoluted strips which serve as a central post for respective panels such as member 12 adjoining one another at right angles, as illustrated in FIG. 5 of my above-identified copending application and patent.

The profile of channel 10 is not critical. Thus, its bottom need not be flat as shown but could be curved or beveled, for example.

I claim:

1. A connector for coupling a structural member to a C-profile bar having an elongate channel accessible through a slot flanked by flanges of the C-profile, comprising a shank of resinous material terminating in a hammerhead, the latter being provided on a transverse surface remote from said shank with a projection adapted to dig into the material of said bar and on an opposite surface with ramp faces shaped to coact with said flanges for forcing said projection into the channel bottom upon rotation of said hammerhead in said channel following introduction thereof through said slot, said projection being integral with a metallic stem axially inserted into said shank.

2. A connector as defined in claim 1 wherein said shank is provided, near an end of said stem opposite said projection, with a generally elbow-shaped incision dividing said shank into two coherent but transversely spreadable portions urged apart by the inserted stem to wedge said shank in a bore of said structural member.

3. A connector as defined in claim 1 wherein said hammerhead has a base of generally rectangular outline with diagonally opposite rounded corners bounding said ramp faces.

4. In combination, a structural member, a C-profile bar having an elongate channel accessible through a narrower slot flanked by a pair of parallel flanges of the C-profile remote from the channel bottom, and a connector coupling said member to said bar, said connector comprising:

a shank anchored to said member and extending substantially transversely to said bar;

a hammerhead on an end of said shank remote from said member received in said channel, said hammerhead having a generally rectangular base of a width less than and of a length greater than the width of said slot, the major sides of the rectangle being perpendicular to said slot in a working position of said connector; and a projection on a transverse surface of said hammerhead remote from said base partly dug into said bar at the channel bottom in said working position, the distance of the tip of said projection from said base exceeding the depth of said channel whereby said base rests on inner surfaces of said flanges in said working position, said hammerhead being provided on said base with a pair of diagonally opposite ramp faces beveled to coact with said inner surfaces upon 90° rotation of said hammerhead from an insertion position in line with said slot into said working position to drive said projection into said channel bottom, said connector being freely shiftable along said channel upon reverse rotation into said insertion position.

5. The combination defined in claim 4 wherein the length of said hammerhead is almost equal to the width of said channel, said base having a pair of rounded diagonally opposite corners bounding said ramp faces and facilitating unidirectional rotation of said hammerhead from said insertion position to said working position.

6. The combination defined in claim 4 wherein said shank and said bar consist of resinous material, said projection being metallic and integral with a stem inserted into said shank along an axis thereof passing through the center of said base, said member having a bore receiving an extremity of said shank remote from said hammerhead, said extremity being split in the vicinity of the inserted end of said stem into two coherent but transversely spreadable portions urged apart by said stem against the wall of said bore.

7. The combination defined in claim 4 wherein said shank has a transverse shoulder separated from said hammerhead by a reduced neck of a height substantially equaling the thickness of said flanges, the latter being received between said shoulder and said hammerhead.

8. In combination, a structural member, a C-profile bar having an elongate channel accessible through a narrower slot flanked by flanges of the C-profile, and a connector coupling said member to said bar, said connector comprising:

a shank anchored to said member and extending substantially transversely to said bar;

a hammerhead on an end of said shank remote from said member received in said channel, said hammerhead having a generally rectangular base of a width less than and of a length greater than the width of said slot, the major sides of the rectangle being perpendicular to said slot in a working position of said connector; and a metallic projection on a transverse surface of said hammerhead remote from said base partly dug into said bar at the channel bottom, the distance of the tip of said projection from said base exceeding the depth of said channel whereby said base rests on said flanges in said working position, said projection being integral with a stem inserted into said shank along an axis thereof passing through the center of said base, said member having a bore receiving an extremity of said shank remote from said hammerhead, said extremity being split in the vicinity of the inserted end of said stem into two coherent but transversely spreadable portions urged apart by said stem against the wall of said bore.

9. In combination, a structural member, a C-profile bar having an elongate channel accessible through a narrower slot flanked by flanges of the C-profile, and a connector coupling said member to said bar, said connector comprising:
- a shank anchored to said member and extending substantially transversely to said bar;
- a hammerhead on an end of said shank remote from said member received in said channel, said hammerhead having a generally rectangular base of a width less than and of a length greater than the width of said slot, the major sides of the rectangle being perpendicular to said slot in a working position of said connector; and
- a projection on a transverse surface of said hammerhead remote from said base partly dug into said bar at the channel bottom, the distance of the tip of said projection from said base exceeding the depth of said channel whereby said base rests on said flanges in said working position, said shank having a transverse shoulder separated from said hammerhead by a reduced neck of a height substantially equaling the thickness of said flanges, the latter being received between said shoulder and said hammerhead.

* * * * *